(12) United States Patent
Russell et al.

(10) Patent No.: US 10,354,137 B2
(45) Date of Patent: Jul. 16, 2019

(54) ROBUST MONITORING GAUGES

(71) Applicant: Intel Corporation, Santa Clara, CA (US)

(72) Inventors: Anne M. Russell, Cedar Park, TX (US); Nikhil Jog, Chandler, AZ (US); Rita Chattopadhyay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 15/283,146

(22) Filed: Sep. 30, 2016

(65) Prior Publication Data

US 2018/0096205 A1  Apr. 5, 2018

(51) Int. Cl.
*G06K 9/00* (2006.01)

(52) U.S. Cl.
CPC ..... *G06K 9/00624* (2013.01); *G06K 2209/01* (2013.01); *G06K 2209/03* (2013.01)

(58) Field of Classification Search
CPC .... G01B 11/26; G01D 13/22; G06T 2207/301
USPC ........................................................ 382/100
See application file for complete search history.

(56) References Cited

U.S. PATENT DOCUMENTS

| | | | |
|---|---|---|---|
| 5,335,177 A | | 8/1994 | Boiteau et al. |
| 5,542,280 A | * | 8/1996 | Markow ............... G01P 1/11 73/1.41 |
| 6,798,895 B1 | | 9/2004 | Takahashi |
| 2004/0234101 A1 | | 11/2004 | Lee et al. |
| 2006/0136177 A1 | | 6/2006 | Patanian |
| 2007/0236366 A1 | * | 10/2007 | Gur ..................... G06K 9/00 340/945 |
| 2008/0148877 A1 | | 6/2008 | Sim |
| 2009/0190795 A1 | | 7/2009 | Derkalousdian et al. |
| 2009/0322884 A1 | | 12/2009 | Bolick et al. |
| 2013/0050498 A1 | * | 2/2013 | Kennedy .............. G06K 9/00 348/160 |
| 2013/0070099 A1 | * | 3/2013 | Gellaboina ........... G06K 9/00 348/160 |
| 2013/0085638 A1 | | 4/2013 | Weinmann et al. |
| 2014/0139682 A1 | * | 5/2014 | Lye .................... H04Q 9/00 348/160 |
| 2014/0286580 A1 | | 9/2014 | Kennedy et al. |

(Continued)

FOREIGN PATENT DOCUMENTS

KR  20060073746 A  6/2006

OTHER PUBLICATIONS

International Search Report and Written Opinion dated Nov. 30, 2016 for International Application No. PCT/US2016/048429, 13 pages.

(Continued)

*Primary Examiner* — Andrew M Moyer
(74) *Attorney, Agent, or Firm* — Schwabe, Williamson & Wyatt, P.C.

(57) ABSTRACT

Methods, systems, and storage media for robust monitoring a gauge are disclosed herein. In an embodiment, a digital image of a gauge may be received to identify an analog value indicator of the gauge and to form an indicator representation corresponding to the analog value indicator. Robust optical character recognition and image filter may provide enhanced gauge reading and/or monitoring. Other embodiments may be disclosed and/or claimed.

20 Claims, 8 Drawing Sheets

(56) References Cited

U.S. PATENT DOCUMENTS

2015/0019714 A1 1/2015 Shaashua et al.
2017/0089692 A1* 3/2017 Chattopadhyay ....... H04W 4/70

OTHER PUBLICATIONS

International Preliminary Report on Patentability dated Apr. 5, 2018 for International Application No. PCT/US2016/048429, 10 pages.
Final Office Action dated Nov. 2, 2017 for US. Appl. No. 14/979,016; 24 pages.
International Search Report and Written Opinion dated Nov. 23, 2017 for International Application No. PCT/US2017/046981, 13 pages.
Office Action dated Jul. 7, 2017 for U.S. Appl. No. 14/979,016; 31 pages.
International Preliminary Report on Patentability dated Jul. 5, 2018 for International Application No. PCT/US2016/062079, 12 pages.
International Search Report and Written Opinion dated Mar. 3, 2017 for International Application No. PCT/US2016/062079, 15 pages.
Rita Chattopadhyay et al. "Monitoring of Gauges", U.S. Appl. No. 14/864,635, filed Sep. 24, 2015, 38 pages.
Rita Chattopadhyay et al. "Determining Values of Angular Gauges", U.S. Appl. No. 14/979,016, filed Dec. 22, 2015, 41 pages.
Office Action dated Nov. 21, 2018 for U.S. Appl. No. 14/864,635; 50 pages.
Final Office Action dated Mar. 11, 2019 for U.S. Appl. No. 14/864,635; 25 pages.

* cited by examiner

ROBUST MONITORING GAUGES

TECHNICAL FIELD

The present disclosure relates to the field of Internet of Things ("IoT"), and in particular, to apparatuses, methods and storage media associated with monitoring of gauges.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The Internet of Things ("IoT") is a network of objects or "things", each of which may be embedded with hardware or software that enable connectivity to the Internet. An object, device, sensor, or "thing" (also referred to as an "IoT device") that is connected to a network typically provides information to a manufacturer, operator, or other connected devices, clients, or servers in order to track information from or about the thing or to obtain or provide services. IoT devices may be deployed in homes, offices, manufacturing facilities, and the natural environment.

Conventional analog gauges, sometimes referred to as analog instrument meters with analog displays, typically have a gauge face with an analog value indicator such as a needle or pointer that pivots about a hinge point and points to a calibrated scale to provide an analog value indication. Analog gauges can have other configurations as well, such as linear pressure or temperature gauges (e.g., thermometers). Such gauges are used widely in science, industry, shipping, etc., in a wide range of situations including factories, mills, power plants, pipelines, etc., on various types of equipment, vehicles, vessels, etc. Analog gauges are monitored by human visual observation which, for a gauge in a remote or inconvenient location, can require significant time, effort, or expense and can even pose varying degrees exposure to discomfort or risk of injury. Some analog gauges have been replaced by gauges that function as IoT devices that communicate gauge value information automatically. However, with the vast installed base of existing analog gauges, human visual observation is still required.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function or main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer-readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

Example embodiments disclosed herein include systems and methods relating to reading of analog gauges. Some of the analog gauges, including the camera performing the reading may be "Internet of Things" (IoT) devices. It should be noted that objects, sensors, or other like devices that are part of the IoT may be referred to as "IoT devices", "smart objects", "smart devices", and the like. The IoT is a network of objects that are embedded with hardware and software components that enable the objects to communicate over a communications network (e.g., the Internet). Because IoT devices are enabled to communicate over a network, the IoT devices may exchange event-based data with service providers in order to enhance or complement the services provided by the service providers. These IoT devices are typically able to transmit data autonomously or with little to no user intervention.

Figure 1:
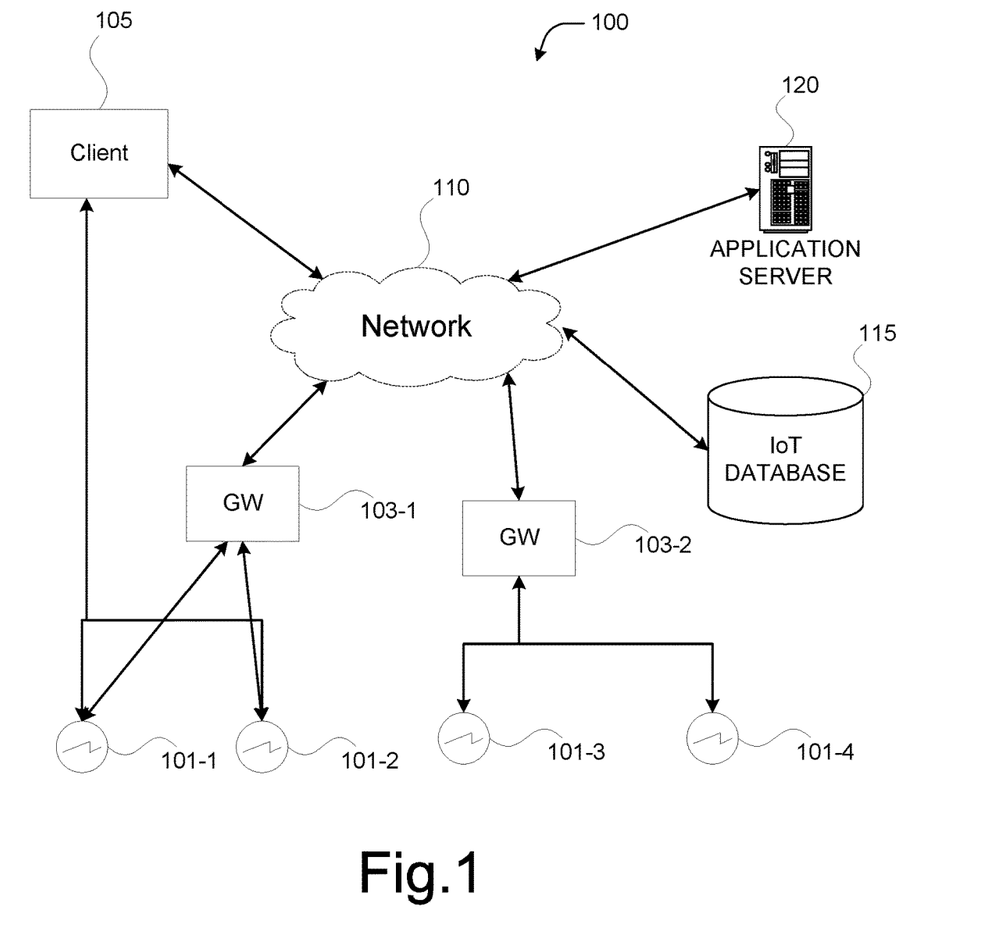
FIG. 1 illustrates a communications network in which various example embodiments described in the present disclosure may be implemented.

FIG. 1 shows a communications network 100 in accordance with various embodiments as an operating environment. As shown in FIG. 1, communications network 100 may include devices 101-1 to 101-4 (collectively referred to as "devices 101"), gateways (GWs) 103-1 and 103-2 (collectively referred to as "GWs 103"), client device 105, network 110, IoT database 115, and application server 120, coupled with each other as shown. Devices 101 may include non-IoT devices and IoT devices, in particular, a number of analog gauges, some of which may be non-IoT devices, while others may be IoT devices. Further, devices 101 may include at least one digital camera (e.g., an IP camera), which may be an IoT device. As will be described in more detail below (with references to the remaining Figures), the at least one digital camera may be employed to facilitate automated reading of the analog gauges regardless whether they are standalone or have been embedded into an IoT device. In embodiments, an image of an analog gauge (a non-IoT device) may be captured by the digital camera (an IoT device) and forwarded to e.g., application server 120 to analyze and determine a reading of the analog gauge, to be more fully described below.

IoT devices 101 may be any object, device, sensor, or "thing" that is embedded with hardware and/or software components that may enable the object, device, sensor, or "thing" to communicate with another device (e.g., client device 105, application server 120, another IoT device 101, etc.) over a network (e.g., network 110) with little or no user intervention. In this regard, IoT devices 101 may include a transmitter/receiver (or alternatively, a transceiver), one or more memory devices, and/or one or more processors. Furthermore, IoT devices 101 may be embedded with or otherwise include a transmitter or other like device that may broadcast an identification signal. In various embodiments, the identification signal may be a radio-based signal, such as a Wi-Fi signal, Bluetooth Low Energy (BLE) signal, an active radio-frequency identification (RFID) signal, an infrared signal, and the like.

According to various embodiments, the identification signal may comprise one or more data packets or data frames, where the data packets or data frames may include a unique identifier associated with the IoT device 101 transmitting the identification signal. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information.

In addition to analog gauges and a digital camera, devices 101 may be other sensors, meters, or other like devices that can capture and/or record data associated with an event. For instance, in various embodiments, devices 101 may be biotic sensors and/or devices, which may monitor implants, biosensors, biochips, and the like. Additionally, IoT devices 101 may be abiotic sensors and/or devices, such as autonomous sensors and/or meters, Machine-Type Communication (MTC) devices, machine-to-machine (M2M) devices, and the like. An event may be any occurrence of an action, such as a temperature change, an electrical output, a change in water usage, an inventory level/amount change, a heart rate, a glucose level, a state/position/orientation change of a device, and the like. In various embodiments, an event may be detected by one or more IoT devices based on sensor outputs, timer values, user actions, and reported as messages to a recipient computing device, and the like.

Once data associated with an event is captured and recorded by an IoT device 101 (e.g., the at least one camera reading an analog gauge), the captured data or information from it may be relayed through the network 110 and reported to a recipient such as a service provider (e.g., an operator of the application server 120), a client device 105, and/or another one of the IoT devices 101. The service provider, a user of the client device or the client device itself, and/or an IoT device may take an appropriate action based on a notification of the event (e.g., reduce or increase temperature, restock inventory items, reduce/increase an activity level, reduce/increase sugar intake, and the like). In various embodiments, an IoT device 101 may connect with or otherwise communicate with the GW 103 via a wireless connection. It should be noted that the IoT devices 101 may be configured to report data on a period or cyclical basis, or based on a desired event that is captured and recorded by an IoT device 101.

In various embodiments, some of the devices 101 may include one or more electro-mechanical components which allow these devices 101 to change their states, positions, and/or orientations. These electro-mechanical components may include one or more motors, actuators, wheels, thrusters, propellers, claws, clamps, hooks, and/or other like electro-mechanical components. In such embodiments, the devices 101 may be configured to change their states, positions, and/or orientations based on one or more captured events and/or instructions or control signals received from a service provider (e.g., an operator of the application server 120) and/or client device 105. In various embodiments, an operator may receive, from one or more IoT devices 101, data associated with a captured event and physically control the IoT devices 101 by transmitting instructions or other like control signals to the IoT devices 101.

GWs 103 may be network elements that may be configured to provide communication services to IoT devices (e.g., some of IoT devices 101) and/or client devices (e.g., client device 105) operating within a computer network (e.g., an enterprise private network, virtual private network, local area network (LAN), a virtual local area network (VLAN), and/or any other like computer network). GWs 103 may be wired or wireless access points, routers, switches, hubs, and/or any other like network devices that may allow computing devices to connect to a network.

Each GW 103 may include one or more processors, a network interface, one or more transmitters/receivers connected to one or more antennas, and a non-transitory computer readable medium. The one or more transmitters/receivers may be configured to transmit/receive data signals to/from one or more IoT devices 101 and/or client device 105, for example. GWs 103 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. GWs 103 may employ one or more network interfaces in order to allow IoT devices 101 and/or client device 105 to connect to network 110, such as Ethernet, Fibre Channel, G.hn or ITU-T, 802.11 or Wi-Fi, Bluetooth, and/or any other like network connection interfaces.

According to various embodiments, GWs 103 may act as central hubs for one or more IoT devices 101 (e.g., IoT devices 101-1 and 101-2 with GW 103-1 and IoT devices 101-3 and 101-4 with GW 103-2, as shown in FIG. 1). In such embodiments, each GW 103 may be a part of a private IoT network that may be operated by a single service provider, IoT device manufacturer, and/or any other like entity. In embodiments where GW 103 is a hub for IoT devices 101 that are included in a private IoT network, GW 103 may connect the IoT devices 101 in the private IoT network to the network 110 and/or client device 105. In various embodiments client device 105 may directly connect with GW 103, such that GW 103 may enable IoT devices 101 to provide services or information to client device 105 via the direct connection.

Network 110 may be any network that allows computers to exchange data. Network 110 may include one or more network elements (not shown) capable of physically or logically connecting computers. The network 110 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

Device database 115 may be a hardware device or system for storing information for a plurality of devices. Device database 115 may include one or more relational database management systems (RDBMS), one or more object database management systems (ODBMS), a column-oriented DBMS, correlation database DBMS, and the like. According to various example embodiments, the device database 115 may be stored on or otherwise associated with one or more data storage devices. These data storage devices may include at least one of a primary storage device, a secondary storage device, a tertiary storage device, a non-linear storage device, and/or other like data storage devices. In some embodiments, device database 115 may be associated with one or more network elements that may enable one or more clients (e.g., client device 105) to query the device database 115 and/or store device information in or retrieve device information from the device database 115. Furthermore, device database 115 may include one or more virtual machines, such that the physical data storage devices containing the device database 115 may be logically divided into multiple virtual data storage devices and/or databases. Alternatively, the device database 115 may reside on one physical hardware data storage device. In various example embodiments, the device database 115 may be the Object Naming Service (ONS), which may provide product descriptions (i.e., indicators) for devices that are embedded with RFID tags.

In general, client device 105 and application server 120 each may be a hardware computing device that may include one or more systems and/or applications for providing one or more services. Client device 105 and application server 120 each may include a processor, memory or computer readable storage medium, and a network interface. Additionally, client device 105 and application server 120 each may be a single physical hardware device, or may be physically or logically connected with other network devices, so as to reside on one or more physical hardware devices. Furthermore, client device 105 and application server 120 each may be connected to, or otherwise associated with, one or more data storage devices (not shown). The application server 120 may be any device capable of receiving and responding to requests from one or more client devices (e.g., client device 105) across a computer network (e.g., network 110) to provide one or more services to client device 105.

In some embodiments, the application server 120 may provide IoT device services, and may be able to generate content such as text, graphics, audio and/or video to be transferred to client device 105, via a Web server (not shown) in the form of HTML, XML, and/or any other appropriate structured language. The handling of requests and responses, (e.g., requests for item information and the information provided in response), as well as the delivery of content between the IoT devices 101, the application server 120, and the client device 105 may be handled by a Web server (not shown). The application server 120 may include an operating system that may provide executable program instructions for the general administration and operation of application server 120, and may include a computer-readable medium storing instructions that, when executed by a processor of the application server 120, may allow the application server 120 to perform its intended functions. Suitable implementations for the operating system and general functionality of the servers are known or commercially available, and are readily implemented by persons having ordinary skill in the art, particularly in light of the disclosure herein. It should be understood that the application server 120 may not be required and the applications and software components discussed herein may be executed on any appropriate device or host machine.

In other embodiments, GWs 103 may further operate to process data received from IoT devices 101, in a manner analogous to operations that may alternatively be performed by client 105 and/or application server 120, and may be referred to as "edge devices" in reference to being located at an "edge" of network 110. An aspect of processing data from IoT devices 101 at edge devices such as GWs 103 is that information may be extracted from the data of IoT devices 101 at such an edge device. The extracted information, rather than the data of the IoT devices 101, may be transmitted from GW 103 over network 110 to client 105 and/or application server 120. As a result, processing data from IoT devices 101 at edge devices such as GWs 103, which may be relatively local to the IoT devices 101, may reduce overall data transfer path lengths and may thereby provide increased security and speed of data and information transfers while reducing data transfer costs.

In FIG. 1, only four devices 101, two GWs 103, one client device 105, one device database 115, and one application server 120 are shown. According to various embodiments, any number of devices, any number of gateways, any number of client devices, any number of servers, and/or any number of databases may be present. Additionally, in some embodiments, application server 120 and/or one or more databases may be virtual machines, and/or they may be provided as part of a cloud computing service. In various embodiments, application server 120 and one or more databases may reside on one physical hardware device, and/or may be otherwise fully integrated with one another. Thus, the depiction of the illustrative communications network 100 in FIG. 1 should be taken as being illustrative in nature, and not to be limiting the scope of the disclosure.

Figure 2:
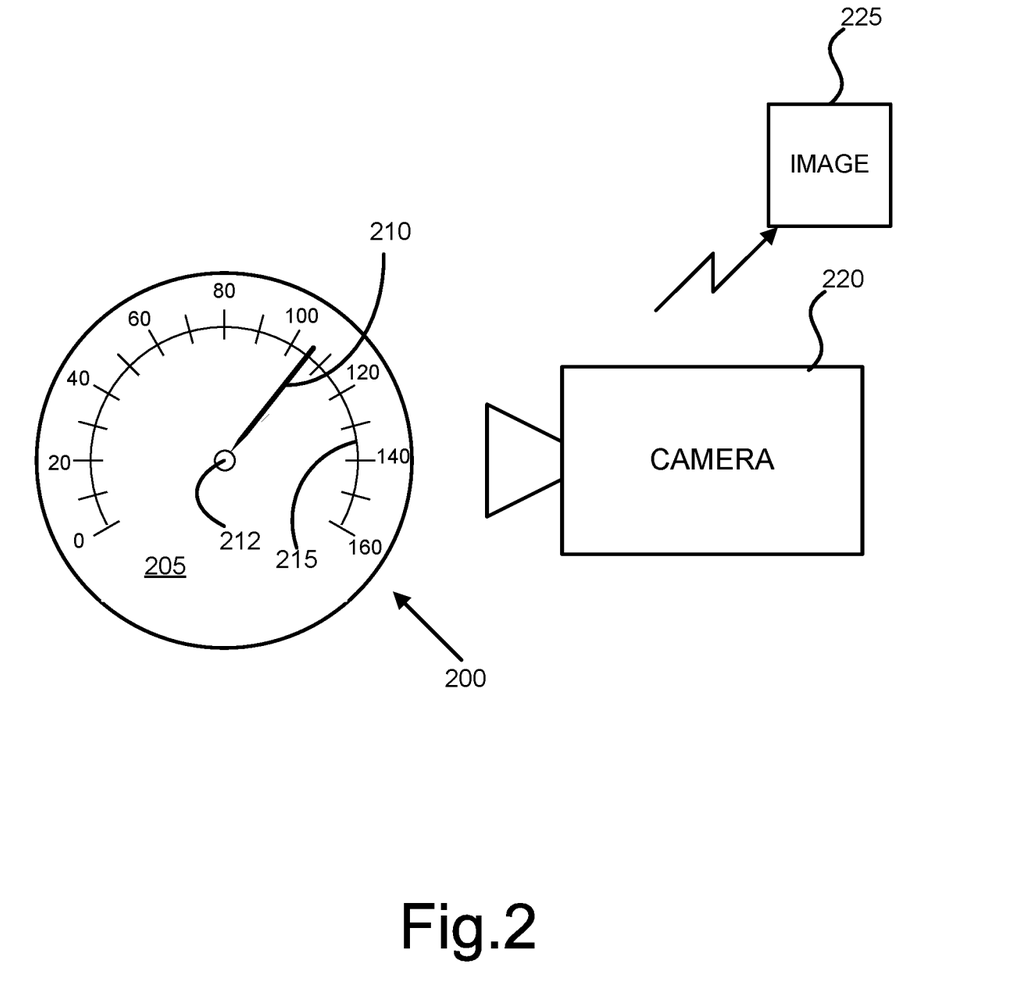
FIG. 2 illustrates an analog gauge and an adjacent digital camera.

FIG. 2 is a diagram illustrating a conventional analog gauge 200 and a digital camera, according to various embodiments. Analog gauge 200 (which may be one of devices 101 of FIG. 1), sometimes referred to as an analog instrument meter with analog display, may have a gauge face 205 with an analog value indicator 210 such as a needle or pointer that pivots about a hinge point 212 and points to a calibrated scale 215 to provide an analog value indication. Gauge 200 may be any of a wide range of gauges used in science, industry, shipping, etc., in a wide range of situations including factories, mills, power plants, pipelines, etc. on various types of equipment, vehicles, vessels, etc. Calibrated scale 215 may be in any increments in reference to any units of measurement according to the application, and may indicate enumerated values or non-numerical measurement ranges (e.g., one or more labeled acceptable "green" zones of performance and one or more undesirable "red" zones of performance).

Conventionally, analog gauge 200 would be monitored by human visual observation which, for a gauge 200 in a remote or inconvenient location, can require significant time, effort, or expense and can even pose varying degrees exposure to discomfort or risk of injury. As described earlier, some analog gauges 200 may be replaced by gauges that function as IoT devices 101 that communicate gauge value information automatically. However, for the vast installed base of existing analog gauges 200, human visual observation is still required.

FIG. 2 also illustrates a digital camera 220 positioned to form a digital image 225 of gauge face 205 and to transmit or otherwise deliver image 225 to, for example, a GW 103, application server 120, or another computing or processing device such that camera 220 may operate in the manner of an IoT device 101. Digital image 225 will include imagery of analog value indicator 210 and calibrated scale 215 and will correspond to a visual observation of an analog value indication of analog gauge 200. It will be appreciated that image 225 may be transmitted from camera 220 by wired or wireless communication.

Although the following description is directed to image 225 being transmitted to a GW 103, which may operate in a manner described below as an edge device relative to network 110, the described operations may be performed by any manner of other processing or computing devices or systems. For example, the image 225 may also be transmitted to application server 120 via the GW 103, wherein one or more of the functions described with regard to FIG. 3 may be performed by the GW 103 while others may be performed by the application server 120.

Figure 3:
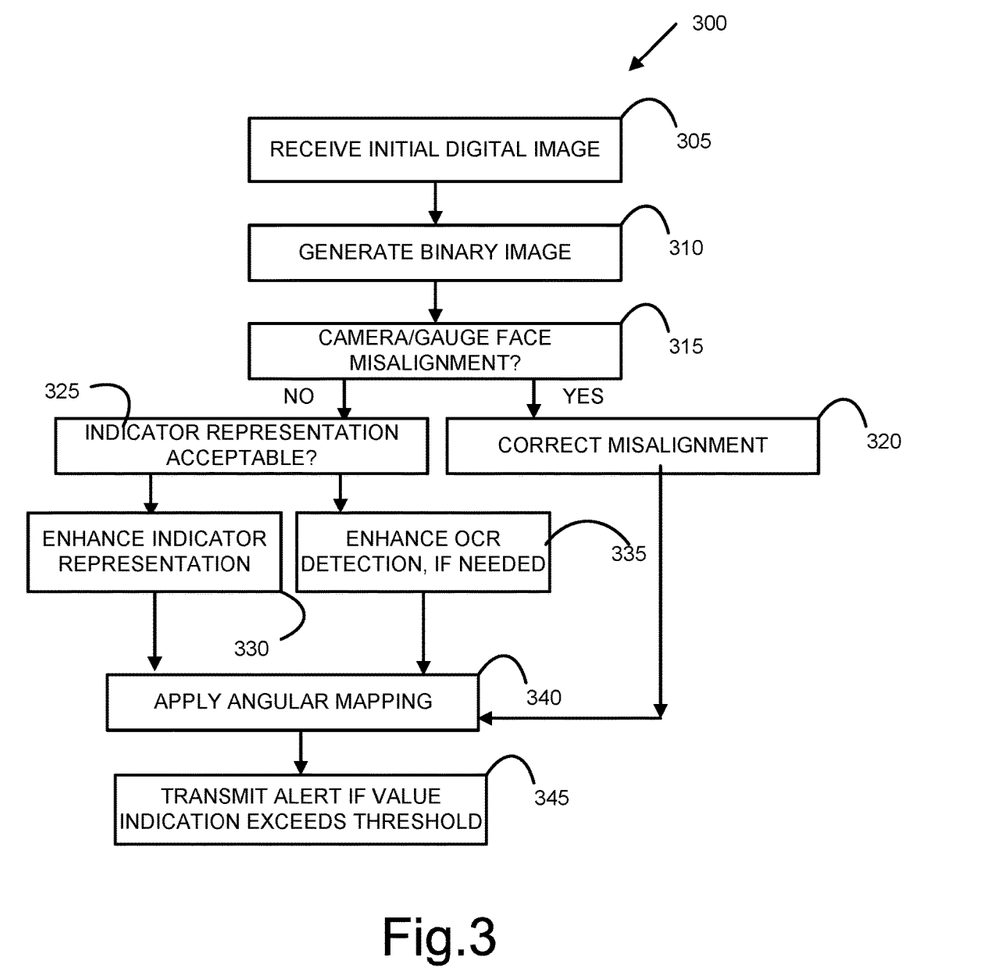
FIG. 3 illustrates an example gauge monitoring apparatus or system.

FIG. 3 is a flowchart illustrating an example process 300 of robust gauge monitoring that may provide robust image processing and gauge reading, according to various embodiments. In embodiments, the operations of process 300 may be performed by GW 103 (FIG. 1). However, it should be noted that other computing devices, e.g., application server 120, may operate the process 300 or one or more portions of it. While particular examples and orders of operations are illustrated in FIG. 3, in various embodiments, these operations may be re-ordered, separated into additional operations, combined, or omitted altogether.

At operation 305, an initial digital image of a gauge face of a gauge may be received. The initial digital image may be received from camera 220 and may include multiple image or picture elements of the gauge face 205, which may include an analog value indicator and plural value characters, such as analog value indicator 210 and numeric or calibrated scale 215 shown in FIG. 2. The image elements may have a range of image values that may correspond to a grey-scale image or an RGB image. In some embodiments, the gauge 200 may be positioned on machinery or equipment that may vibrate, and/or the analog value indicator 210 may jiggle and/or oscillate as a result of variability in the measured parameter and/or operation of the gauge 200. Camera 220 may operate at an imaging speed and/or shutter speed that may be faster than the rate of vibration of the machinery or equipment, and also may be faster than jiggling and/or oscillation of the analog value indicator 210. As a result, camera 220 may obtain image 225 with a clear and distinct representation of gauge face 205 and analog value indicator 210 despite vibration of machinery or equipment and/or jiggling or oscillation of analog value indicator 210.

Figure 4:
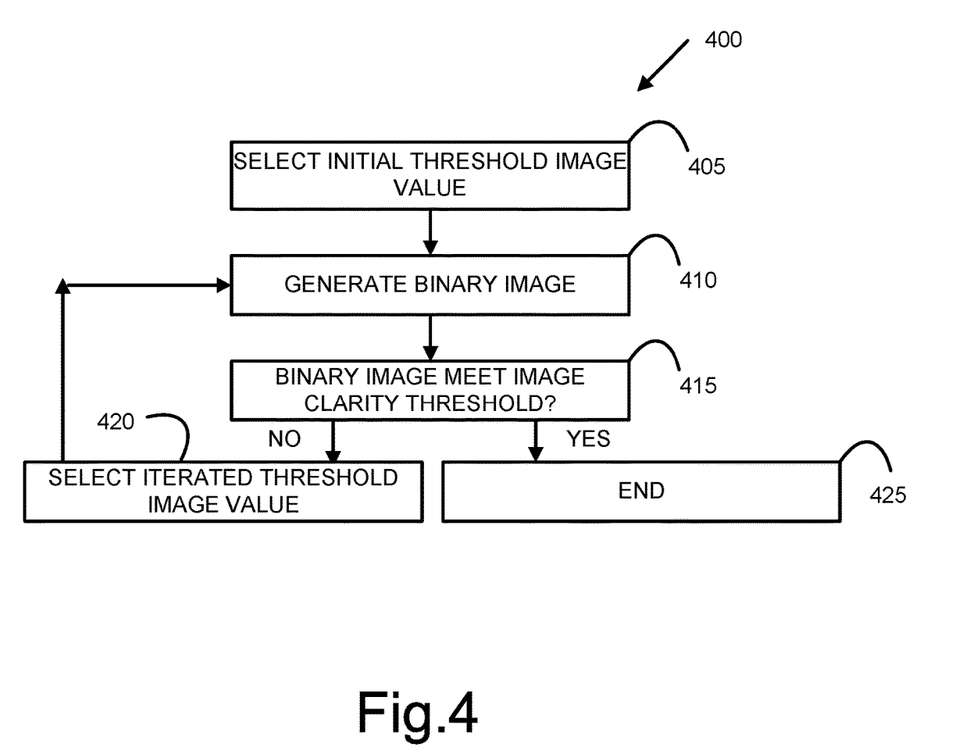
FIG. 4 is a flowchart illustrating an example process for generating a binary image

At operation 310 a binary image with image elements of first and second states (e.g., black and white) may be generated from the initial digital image. In embodiments, generating the binary image may include applying multiple thresholds to the image values of the initial image elements to identify the image elements of the first and second states with enhanced clarity and/or accuracy. FIG. 4 is a flowchart illustrating an example process 400, which may generate a binary image according to operation 310.

Operation 315 is a query whether the initial digital image includes misalignment between the camera (e.g., camera 220) and the gauge face (e.g., gauge face 205). As an example, misalignment between the camera and the gauge face may be indicated by an eccentricity in the image of the gauge face, which otherwise would typically be circular. If the initial digital image includes misalignment between the camera and the gauge face, operation 315 may proceed to operation 320. If the initial digital image does not include misalignment between the camera and the gauge face, operation 315 may proceed to operation 325. As examples, misalignment between the camera (e.g., camera 220) and the gauge face (e.g., gauge face 205) may arise in connection with initial misaligned positioning of camera 220 relative to gauge face 205 and/or may arise in connection with movement between camera 220 and gauge face 205 after initial placement, which movement may arise in connection with vibration of machinery or equipment that may support or be in proximity to camera 220 and/or gauge face 205.

Figure 5:
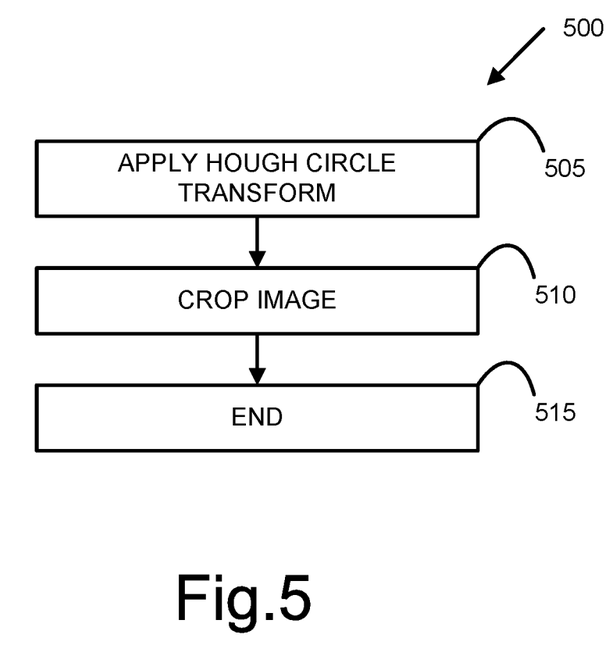
FIG. 5 is a flowchart illustrating an example process for correcting misalignment between a camera and a gauge face, in whole or in part.

At operation 320 misalignment between the camera and the gauge face may be corrected, in whole or in part. FIG. 5 is a flowchart illustrating an example process 500, which may correct misalignment between the camera and the gauge face in accordance with operation 320.

Operation 325 is a query whether an indicator representation of the analog value indicator in the binary image is acceptable. If the indicator representation of the analog value indicator in the binary image is not acceptable, operation 325 may proceed to operation 330. If the indicator representation of the analog value indicator in the binary image is acceptable, operation 325 may proceed to operation 335.

Figure 6:
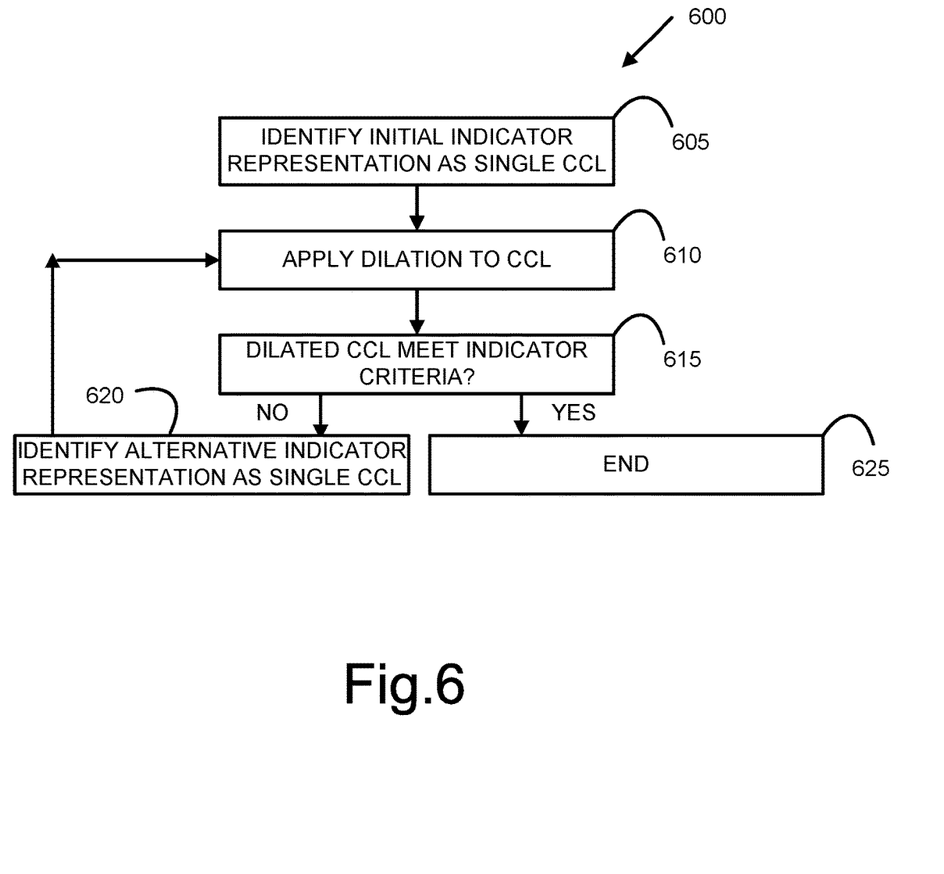
FIG. 6 is a flowchart illustrating an example process for enhancing the indicator representation of the analog value indicator in the binary image

At operation 330 the indicator representation of the analog value indicator in the binary image may be enhanced, in whole or in part. FIG. 6 is a flowchart illustrating an example process 600, which may enhance the indicator representation of the analog value indicator in the binary image according to operation 330.

Figure 7:
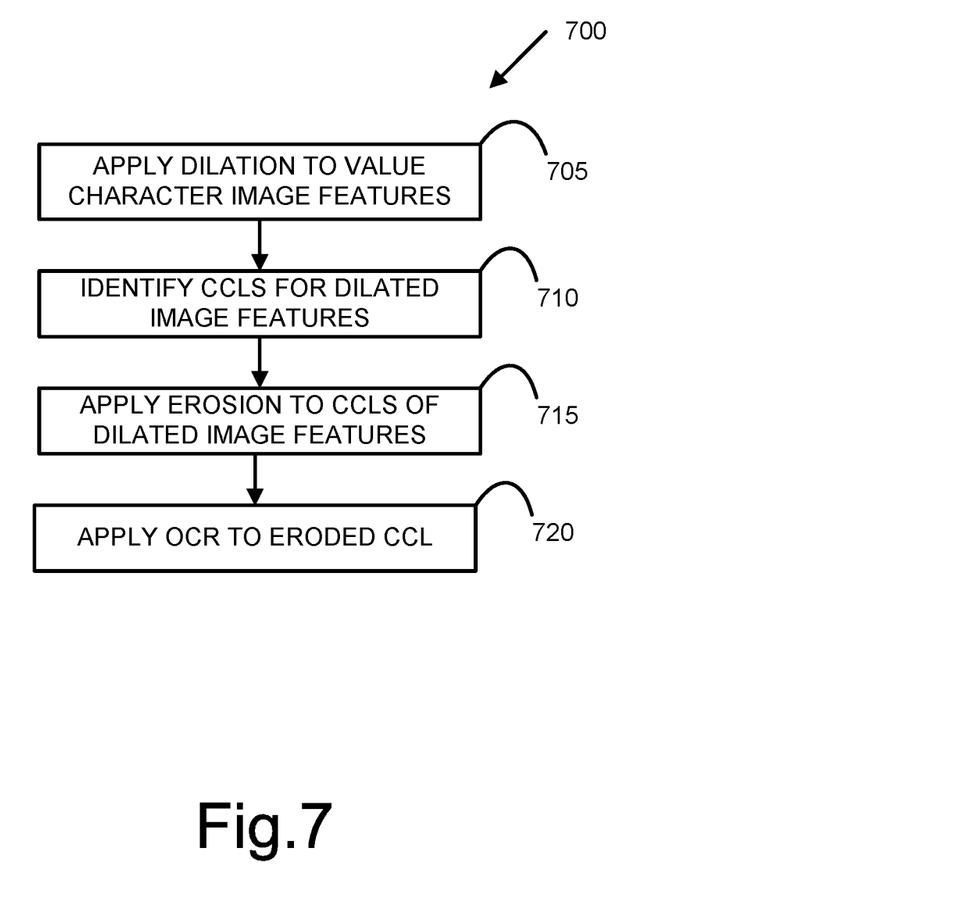
FIG. 7 is a flowchart illustrating an example process for enhancing optical character recognition of value characters.

At operation 335 OCR detection may be enhanced, if needed. FIG. 7 is a flowchart illustrating an example process 700 of enhancing OCR detection.

Figure 8:
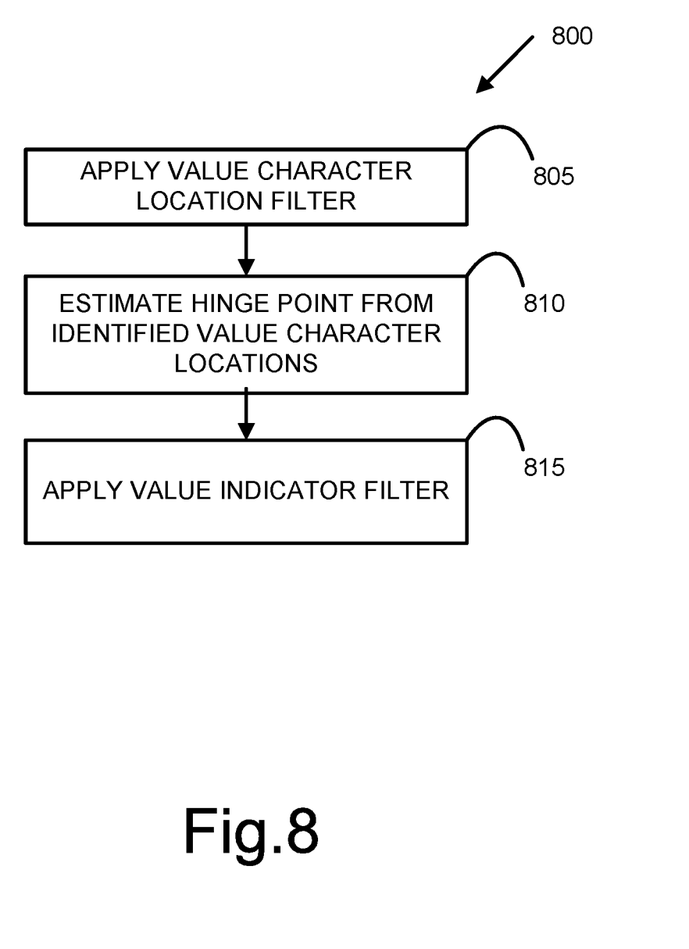
FIG. 8 is a flowchart illustrating an example process 800 for applying angular mapping to images of the analog value indicator and plural value characters, which may enhance accuracy and clarity of gauge monitoring; all in accordance with various embodiments.

At operation 340 angular mapping may be applied to images of the analog value indicator and plural value characters. FIG. 8 is a flowchart illustrating an example process 800 to apply angular mapping to images of the analog value indicator and plural value characters.

At operation 345, an alert may be transmitted if the analog value indication exceeds a preselected threshold value.

FIG. 4 is a flowchart illustrating an example process 400, which may generate a binary image according to operation 310, according to various embodiments.

At operation 405 an initial threshold image value is selected to identify image elements of first and second states (e.g., black and white). For example, with a unitary image value range, an initial threshold image value between the first and second states may be 0.49. Initial image elements with image values less than or equal to the threshold image value may correspond to the first state (e.g., black), and initial image elements with image values greater than the initial threshold image value may correspond to the second state (e.g., white). In embodiments, the initial threshold image value may be based upon a histogram mapping the numbers of initial image elements at each image value and identifying from the histogram an apparent initial threshold image value. As an example, the apparent initial threshold image value may correspond to a value mid-way between two histogram peaks corresponding to greatest numbers of image elements of a higher value (e.g., white) and a lower value (e.g., black).

At operation 410 a binary image with image elements of first and second states (e.g., black and white) may be generated with respect to the threshold image value applied to the image values of the initial image elements.

Operation 415 is a query whether the initial binary image meets an image clarity threshold. In embodiments, the image clarity threshold of the binary image may relate to clarity of the analog value indicator and/or the plural value characters. The image clarity threshold with regard to the value characters may include applying optical character recognition (OCR) to apparent characters and determining whether a threshold number of the characters may be resolved. The image clarity threshold with regard to the binary image of the value indicator may include determining whether the binary image of the value indicator corresponds to length and/or linearity thresholds. If the initial binary image does not meet the image clarity threshold, operation 415 may proceed to operation 420. If the initial binary image meets the image clarity threshold, operation 415 may proceed to termination 425 to end process 400 with a binary image that has threshold clarity.

At operation 420 an iterated threshold image value, different from the preceding threshold image value, is selected. For example, the iterated threshold image value may be based upon the histogram mapping the numbers of initial image elements at each image value. As an example, a first iterated threshold image value may correspond to a minimum value between two histogram peaks corresponding to greatest numbers of image elements of a higher value (e.g., white) and a lower value (e.g., black). As another example, subsequent iterations may step in value in alternately increasing and decreasing increments from the minimum value or the initial value. Operation 420 may return to operation 410.

Termination 425 terminates process 400 with a binary image that has threshold clarity.

FIG. 5 is a flowchart illustrating an example process 500, which may correct misalignment between the camera and the gauge face, in whole or in part, according to operation 320, according to various embodiments.

At operation 505, a transform, e.g., Hough circle transform, may be applied to the initial digital image, which may detect a circular periphery of the gauge face, even though the initial digital image was captured with the camera misaligned from the gauge.

At operation 510, the initial digital image outside the detected circular periphery of the gauge face may be cropped.

At operation 515 process 500 may terminate.

FIG. 6 is a flowchart illustrating an example process 600, which may enhance the indicator representation of the analog value indicator in the binary image according to operation 330, according to various embodiments. In embodiments, process 600 may improve identification of thin or narrow value indicators (e.g., "needles) and/or identification of value indicators in the presence of glare or poor lighting.

At operation 605, an initial indicator representation of the analog value indicator in the binary image may be identified as a single connected component label (CCL).

At operation 610, dilation may be applied to the CCL of the initial indicator representation of the analog value indicator to provide a dilated CCL of the indicator representation.

Operation 615 is a query whether the dilated CCL of the indicator representation meets one or more predefined analog value indicator criteria, which may relate to one or more of length, orientation, linearity, etc. If the dilated CCL of the indicator representation does not meet the one or more predefined analog value indicator criteria, operation 615 proceeds to operation 620. If the dilated CCL of the indicator representation meets the one or more predefined analog value indicator criteria, operation 615 proceeds to termination 625.

At operation 620 an alternative indicator representation of the analog value indicator in the binary image may be identified as a connected component label (CCL). Operation 620 may return to operation 610.

Termination 625 may terminate process 600.

FIG. 7 is a flowchart illustrating an example process 700, which may enhance optical character recognition of value characters according to operation 335, according to various embodiments. In embodiments, process 700 further may improve identification of value indicators that are thin or narrow and/or in the presence of glare or poor lighting.

At operation 705, dilation may be applied to image features that may be value characters. As a result of the dilation, the image features may be enhanced and/or "fuller" so that adjacent value characters (e.g., the "1" and "0" in "10") may appear more closely associated.

At operation 710, CCLs may be identified with respect to the dilated image features. The enhanced and/or "fuller" aspect of the dilated image features may allow adjacent value characters to be associated together as a single CCL (e.g., the "1" and "0" in "10").

At operation 715, erosion may be applied to the CCLs corresponding to adjacent dilated image features. Such erosion may enhance clarity of the CCLs and so may reduce effects of glare and/or poor illumination.

At operation 720, OCR may be applied to the eroded CCL. The CCLs may provide enhanced OCR recognition as a result of potential multi-character CCLs and the increased sharpness and reduced glare effects following erosion.

Process 700 may be employed in connection with OCR detection of operation 335. In embodiments, process 700 in combination with iterative thresholding of process 400 may provide enhanced OCR performance, such as in the presence of glare or other illumination problems. Process 700 may also be employed to facilitate angular mapping of operation 340, which is described below with reference to FIG. 8.

FIG. 8 is a flowchart illustrating an example process 800 to apply angular mapping to images of the analog value indicator and plural value characters, which may enhance accuracy and clarity of gauge monitoring, according to various embodiments.

At operation 805 a value character location filter may be applied to filter, limit, or constrain locations on the gauge face where value characters may occur. For example, gauge values on arc-style gauges may typically be located in the upper half of the gauge. Gauge values on other gauges may extend below the upper half of the gauge, but may typically be in a generally uniform radial arrangement. The value character location filter of operation 805 may set constrained locations on the gauge face where value characters may occur, and thereby may reduce or eliminate false readings of gauge value characters that are in other locations on the gauge face.

At operation 810, a hinge point for a value indicator (e.g., needle) may be estimated with respect to locations of identified value characters. In an embodiment, extrapolation from three identified value characters to a common point of intersection may estimate a location of the hinge point. The extrapolation may employ an approximate length of the value indicator, as approximated by the radius of the arrangement of character locations. Estimation of the location of the hinge point may further improve and/or confirm identification of the value indicator, such as by identifying a prospective value indicator CCL as one that intersects the estimated hinge point or confirming a hinge point location that may be identified by an alternative operation, such as a Hough Line Transform. In alternative embodiments, expected locations of value characters may be employed even if OCR does not recognize three character locations.

In another embodiment, a hinge point location may be estimated from locations of two identified value characters. This embodiment may facilitate hinge point identification even if the value indicator has a vertical orientation or the value indicator has not yet been located.

For example, a hinge point location may be designated (x, y) in which the y coordinate may be unknown, but the x coordinate may be estimated with respect to the center of a first Hough circle, as described with reference to process 500. Coordinate locations of first and second identified value characters may be designated (x1, y1) and (x2, y2), respectively. With (x1,y1) and (x2,y2) equidistance from (x,y):

$$(x1-x)^2+(y1-y)^2=(x2-x)^2+(y2-y)^2$$

The variables x, x1, y1, x2, y2 are known. As an example, consider them to be 5, 10, 12, 10, 20, respectively. The above equation simplifies to $$25+(12-y)^2=25+(20-y)^2,$$

which is linear and can be solved to find the value of y, and therefore the estimated location of the hinge point.

At operation 815 a value indicator filter may further omit or filter-out gauge features that may commonly give false indications of the value indicator or "needle," thereby to provide robust needle identification. For example, some gauge faces include ornamental or other features that that become horizontal lines in the binary image and may be proximal to the value indicator. As a result, such ornamental or other features in the binary image may become attached to the CCL for the value indicator or "needle" and may interfere with correct identification of the value indicator. As a result, the value indicator filter of operation 815 may omit or filter-out such features, which may commonly appear as horizontal lines or may appear as lines that may be separate from and located below a dominant CCL that may correspond to the needle.

Some non-limiting Examples are provided below.

Example 1 may include an apparatus for monitoring of a gauge, the apparatus may comprise one or more processors and a non-transitory computer-readable medium that stores instructions which, when executed by the one or more processors, cause the apparatus to: receive a digital image of a gauge having an analog value indicator and plural value characters; form an indicator representation corresponding to the analog value indicator and determine the plural gauge value characters from the digital image with adjustment of the digital image to improve at least one of the indicator representation and determination of the plural gauge value characters; determine from the indicator representation and one or more of the gauge value characters an indicated gauge value; and transmit the indicated gauge value to a gauge value recipient.

Example 2 may include the apparatus of example 1 in which the digital image may include initial image elements with a range of image values and the apparatus may further include generating from the digital image a binary image with image elements of first and second states, wherein generating the binary image may include applying plural thresholds to the image values of the initial image elements to identify the image elements of the first and second states.

Example 3 may include the apparatus of example 2 wherein the plural thresholds may be applied to the initial image elements in iteration with determining the plural gauge value characters.

Example 4 may include the apparatus of example 2 wherein the plural thresholds may be applied to the initial image elements in iteration with forming the indicator representation.

Example 5 may include the apparatus of example 1 further may include providing, by the computing device, centered alignment of the digital image of the gauge.

Example 6 may include the apparatus of example 5 wherein the gauge may include a circular face and providing centered alignment of the digital image of the gauge may include applying a Hough circle transformation to the digital image of the gauge.

Example 7 may include the apparatus of example 6 and may further include cropping the digital image with centered alignment.

Example 8 may include the apparatus of example 1 wherein adjustment of the digital image may include improving the indicator representation with dilation of the indicator representation.

Example 9 may include the apparatus of example 1 wherein adjustment of the digital image may include improving the determining of the plural gauge value characters with at least one of dilation and erosion of one or more of the plural gauge value characters.

Example 10 may include the apparatus of example 1 wherein adjustment of the digital image may include improving the indicator representation with respect to determination of the plural gauge value characters.

Example 11 may include the apparatus of example 1 wherein improving the indicator representation with respect to determination of the plural gauge value characters may include identifying a hinge point of the indicator representation with respect to determination of the plural gauge value characters.

Example 12 may include the apparatus of example 1 wherein adjustment of the digital image may include improving the indicator representation with a connected component representation that may include the analog value indicator as at least one of plural connected components that extends toward the plural gauge value characters.

Example 13 may include the apparatus of example 1 and may further comprise a digital camera to provide the digital image.

Example 14 may include the apparatus of example 13 in which the one or more processors and the non-transitory computer-readable medium may be positioned remotely from the digital camera.

Example 15 may include a method for monitoring of a gauge, the method may comprise: receiving, by a computing device, a digital image of a gauge having an analog value indicator and plural value characters; forming, by the computing device, an indicator representation corresponding to the analog value indicator; determining, by the computing device, the plural gauge value characters from the digital image; determining, by the computing device, from the indicator representation and one or more of the gauge value characters an indicated gauge value; and transmitting the indicated gauge value to a gauge value recipient.

Example 16 may include the method of example 15 and may further include adjusting the digital image to improve at least one of the indicator representation and the determining of the plural gauge value characters.

Example 17 may include the method of example 16 in which the digital image may include initial image elements with a range of image values and the method may further include generating from the digital image a binary image with image elements of first and second states, wherein generating the binary image may include applying plural thresholds to the image values of the initial image elements to identify the image elements of the first and second states.

Example 18 may include the method of example 17 wherein the plural thresholds may be applied to the initial image elements in iteration with determining the plural gauge value characters.

Example 19 may include the method of example 17 wherein the plural thresholds may be applied to the initial image elements in iteration with forming the indicator representation.

Example 20 may include the method of example 15 and may further include providing, by the computing device, centered alignment of the digital image of the gauge.

Example 21 may include the method of example 20 wherein the gauge may include a circular face and providing centered alignment of the digital image of the gauge may include applying a Hough circle transformation to the digital image of the gauge.

Example 22 may include the method of example 21 and may further include cropping the digital image with centered alignment.

Example 23 may include the method of example 16 wherein adjusting the digital image may include improving the indicator representation with dilation of the indicator representation.

Example 24 may include the method of example 16 wherein adjusting the digital image may include improving the determining of the plural gauge value characters with at least one of dilation and erosion of one or more of the plural gauge value characters.

Example 25 may include the method of example 16 wherein adjusting the digital image may include improving the indicator representation with respect to determination of the plural gauge value characters.

Example 26 may include the method of example 16 wherein improving the indicator representation with respect to determination of the plural gauge value characters may include identifying a hinge point of the indicator representation with respect to determination of the plural gauge value characters.

Example 27 may include the method of example 16 wherein adjusting the digital image may include improving the indicator representation with a connected component representation that may include the analog value indicator as at least one of plural connected components that extends toward the plural gauge value characters.

Example 28 may include an apparatus for monitoring of a gauge, the apparatus may comprise one or more processors and a non-transitory computer-readable medium that stores instructions which, when executed by the one or more processors, cause the apparatus to: receive a digital image of a gauge having an analog value indicator and plural value characters; form an indicator representation corresponding to the analog value indicator and determine the plural gauge value characters from the digital image with adjustment of the digital image to improve at least one of the indicator representation and determination of the plural gauge value characters; determine from the indicator representation and one or more of the gauge value characters an indicated gauge value; and transmit the indicated gauge value to a gauge value recipient.

Example 29 may include the apparatus of example 28 in which the digital image may include initial image elements with a range of image values and the apparatus may further include generating from the digital image a binary image with image elements of first and second states, wherein generating the binary image may include applying plural thresholds to the image values of the initial image elements to identify the image elements of the first and second states.

Example 30 may include the apparatus of example 29 wherein the plural thresholds may be applied to the initial image elements in iteration with determining the plural gauge value characters.

Example 31 may include the apparatus of example 29 wherein the plural thresholds may be applied to the initial image elements in iteration with forming the indicator representation.

Example 32 may include the apparatus of any of examples 28-31 and may further include providing, by the computing device, centered alignment of the digital image of the gauge.

Example 33 may include the apparatus of example wherein the gauge may include a circular face and providing centered alignment of the digital image of the gauge may include applying a Hough circle transformation to the digital image of the gauge.

Example 34 may include the apparatus of example may further include cropping the digital image with centered alignment.

Example 35 may include the apparatus of any of examples 28-31 wherein adjustment of the digital image may include improving the indicator representation with dilation of the indicator representation.

Example 36 may include the apparatus of any of examples 28-31 wherein adjustment of the digital image may include improving the determining of the plural gauge value characters with at least one of dilation and erosion of one or more of the plural gauge value characters.

Example 37 may include the apparatus of any of examples 28-31 wherein adjustment of the digital image may include improving the indicator representation with respect to determination of the plural gauge value characters.

Example 38 may include the apparatus of example 28 wherein improving the indicator representation with respect to determination of the plural gauge value characters may include identifying a hinge point of the indicator representation with respect to determination of the plural gauge value characters.

Example 39 may include the apparatus of example 28 wherein adjustment of the digital image may include improving the indicator representation with a connected component representation that may include the analog value indicator as at least one of plural connected components that extends toward the plural gauge value characters.

Example 40 may include the apparatus of any of examples 28-31 and may further comprise a digital camera to provide the digital image.

Example 41 may include the apparatus of example 40 in which the one or more processors and the non-transitory computer-readable medium may be positioned remotely from the digital camera.

Example 42 may include a method for monitoring of a gauge, the method may comprise: receiving, by a computing device, a digital image of a gauge having an analog value indicator and plural value characters; forming, by the computing device, an indicator representation corresponding to the analog value indicator; determining, by the computing device, the plural gauge value characters from the digital image; determining, by the computing device, from the indicator representation and one or more of the gauge value characters an indicated gauge value; and transmitting the indicated gauge value to a gauge value recipient.

Example 43 may include the method of example 42 and may further include adjusting the digital image to improve at least one of the indicator representation and the determining of the plural gauge value characters.

Example 44 may include the method of example 43 in which the digital image may include initial image elements with a range of image values and the method may further include generating from the digital image a binary image with image elements of first and second states, wherein generating the binary image includes applying plural thresholds to the image values of the initial image elements to identify the image elements of the first and second states.

Example 45 may include the method of example 44 wherein the plural thresholds may be applied to the initial image elements in iteration with determining the plural gauge value characters.

Example 46 may include the method of example 44 wherein the plural thresholds may be applied to the initial image elements in iteration with forming the indicator representation.

Example 47 may include the method of any of examples 42-46 and may further include providing, by the computing device, centered alignment of the digital image of the gauge.

Example 48 may include the method of example 47 wherein the gauge may include a circular face and providing centered alignment of the digital image of the gauge may include applying a Hough circle transformation to the digital image of the gauge.

Example 49 may include the method of example 48 may further include cropping the digital image with centered alignment.

Example 50 may include the method of any of examples 43-46 wherein adjusting the digital image may include improving the indicator representation with dilation of the indicator representation.

Example 51 may include the method of any of examples 43-46 wherein adjusting the digital image may include improving the determining of the plural gauge value characters with at least one of dilation and erosion of one or more of the plural gauge value characters.

Example 52 may include the method of any of examples 43-46 wherein adjusting the digital image may include improving the indicator representation with respect to determination of the plural gauge value characters.

Example 53 may include the method of any of examples 43-46 wherein improving the indicator representation with respect to determination of the plural gauge value characters may include identifying a hinge point of the indicator representation with respect to determination of the plural gauge value characters.

Example 54 may include the method of any of examples 43-46 wherein adjusting the digital image may include improving the indicator representation with a connected component representation that may include the analog value indicator as at least one of plural connected components that extends toward the plural gauge value characters.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for facilitating reading a gauge, from an edge of a network, the apparatus comprising:
   networking circuitry to couple a plurality of client devices to the network, from the edge of the network; and
   one or more processors and a non-transitory computer-readable medium that stores instructions which, when executed by the one or more processors, cause the apparatus to:
   receive, from an Internet-of-things (IoT) camera, a digital image of the gauge, with the gauge having an analog value indicator and plural gauge value characters, and being proximally located to the IoT camera;
   form an indicator representation corresponding to the analog value indicator and determine the plural gauge value characters;
   determine from the indicator representation and one or more of the gauge value characters an indicated gauge value; and
   transmit the indicated gauge value to a remote gauge value recipient via the network;
   wherein the digital image includes initial image elements with a range of image values and the apparatus is further caused to generate from the digital image a binary image with image elements of first and second states, wherein to generate the binary image includes to apply plural thresholds to the image values of the initial image elements to identify the image elements of the first and second states.

2. The apparatus of claim 1, wherein the plural thresholds are applied to the initial image elements in iteration with determining the plural gauge value characters.

3. The apparatus of claim 1, wherein the plural thresholds are applied to the initial image elements in iteration with forming the indicator representation.

4. The apparatus of claim 1, wherein the apparatus is further caused to determine whether the IoT camera and a face of the gauge is misaligned, and on determination that the IoT camera and the face of the gauge is misaligned, perform application of a transformation to the digital image such that the transformed digital image is substantially equivalent to having been taken with the IoT camera and the face of the gauge being aligned.

5. The apparatus of claim 4, wherein the gauge includes a circular face and performance of application of a transformation to the digital image includes performance of application of a Hough circle transformation to the digital image.

6. The apparatus of claim 5, wherein the apparatus is further caused to crop the transformed digital image.

7. The apparatus of claim 1, wherein to form an indicator representation includes formation of an initial indicator representation, determination of whether the initial indicator representation meets one or more predefined analog value indicator criteria, and if the initial indicator representation does not meet the one or more predefined analog value indicator criteria, performance of one or more applications of dilation to the initial indicator representation to provide the indicator representation while meeting the one or more predefined analog value indicator criteria.

8. The apparatus of claim 1, wherein the apparatus is further caused to apply at least one of dilation and erosion of one or more of the plural gauge value characters.

9. The apparatus of claim 1, wherein the apparatus is further caused to identify a hinge point of the indicator representation with respect to determination of the plural gauge value characters.

10. The apparatus of claim 7, wherein formation of the initial indicator representation, and determination of whether the initial indicator representation meets one or more predefined analog value indicator criteria, includes identification of the initial indicator representation as a connected component representation.

11. The apparatus of claim 1, wherein the networking circuitry is configured to process or route data packets in accordance with a communication protocol selected from a Point-to-Point Protocol (PPP), a High Level Data Link Control (HDLC) protocol, Internet Protocol version 4 (IPv4), or Internet Protocol version 6 (IPv6).

12. The apparatus of claim 1, wherein the apparatus is a selected one of a wireless access point, a router, a switch, or a hub.

13. A method for facilitating reading of a gauge, from an edge of a network, the method comprising:
   receiving, by a networking device disposed at the edge of the network, from an IoT camera, a digital image of a gauge having an analog value indicator and plural gauge value characters, and being disposed proximally to the IoT camera;
   forming, by the networking device, an indicator representation corresponding to the analog value indicator;
   determining, by the networking device, the plural gauge value characters from the digital image;
   determining, by the networking device, from the indicator representation and one or more of the gauge value characters an indicated gauge value; and
   transmitting, by the networking device, the indicated gauge value to a remote gauge value recipient, via the network;
   wherein the digital image includes initial image elements with a range of image values and the method further includes generating, by the networking device, from the digital image, a binary image with image elements of first and second states, wherein generating the binary image includes applying plural thresholds to the image values of the initial image elements to identify the image elements of the first and second states.

14. The method of claim 13, wherein the plural thresholds are applied to the initial image elements in iteration with determining the plural gauge value characters.

15. The method of claim 13, wherein the plural thresholds are applied to the initial image elements in iteration with forming the indicator representation.

16. The method of claim 13, further including determining, by the networking device, whether the IoT camera and a face of the gauge is misaligned, and on determination that the IoT camera and the face of the gauge is misaligned, performing, by the networking device, application of a transformation to the digital image such that the transformed digital image is substantially equivalent to having been taken with the IoT camera and the face of the gauge being aligned.

17. The method of claim 16, wherein the gauge includes a circular face and performing an application of a transformation to the digital image includes performing application of a Hough circle transformation to the digital image.

18. The method of claim 17, further including cropping, by the networking device, the transformed digital image.

19. The method of claim 13, wherein forming the indicator representation corresponding to the analog value indicator includes forming an initial indicator representation, determining whether the initial indicator representation meets one or more predefined analog value indicator criteria, and if the initial indicator representation does not meet the one or more predefined analog value indicator criteria, performing one or more applications of dilation to the initial indicator representation to form the indicator representation while meeting the one or more predefined analog value indicator criteria.

20. The method of claim 13, wherein determining the plural gauge value characters includes applying, by the networking device, at least one of dilation and erosion of one or more of the plural gauge value characters.

\* \* \* \* \*